United States Patent [19]
Wentworth

[11] 3,746,888
[45] July 17, 1973

[54] MAGNETIC FIRING CIRCUITS

[75] Inventor: Fitzwilliam Allan Wentworth, Mosman, New South Wales, Australia

[73] Assignee: Cutler-Hammer Inc., Milwaukee, Wis.

[22] Filed: Sept. 23, 1971

[21] Appl. No.: 182,963

[52] U.S. Cl............ 307/282, 307/88 MP, 307/314
[51] Int. Cl. .............................................. H03k 3/45
[58] Field of Search............... 307/88 MP, 282, 314; 328/65

[56] References Cited
UNITED STATES PATENTS

| | | | |
|---|---|---|---|
| 3,524,078 | 8/1970 | Harris, Jr. | 307/314 X |
| 2,849,625 | 8/1958 | Germain | 307/88 MP |
| 3,462,754 | 8/1969 | Kelly | 307/314 X |

Primary Examiner—John Zazworsky
Attorney—Hugh R. Rather

[57] ABSTRACT

A fully solid state electrical welding control system employs a magnetic firing circuit for producing pulses for controlling, for example, the solenoid air valve. The magnetic core of the firing circuit has a rectangular hysteresis loop, and a primary winding on the core is connected to the A.C. source. Current is produced through a control winding to hold the core in a state of saturation in one direction when a control voltage is absent, and a current is produced in the opposite direction through that winding to hold the core in a state of saturation in the opposite direction when the control voltage is present. Pulses are taken from an output winding on the core, and are produced synchronously with the mains supply with a high degree of electrical isolation and a high degree of decoupling between the control circuit and the alternating current and pulse circuits.

3 Claims, 1 Drawing Figure

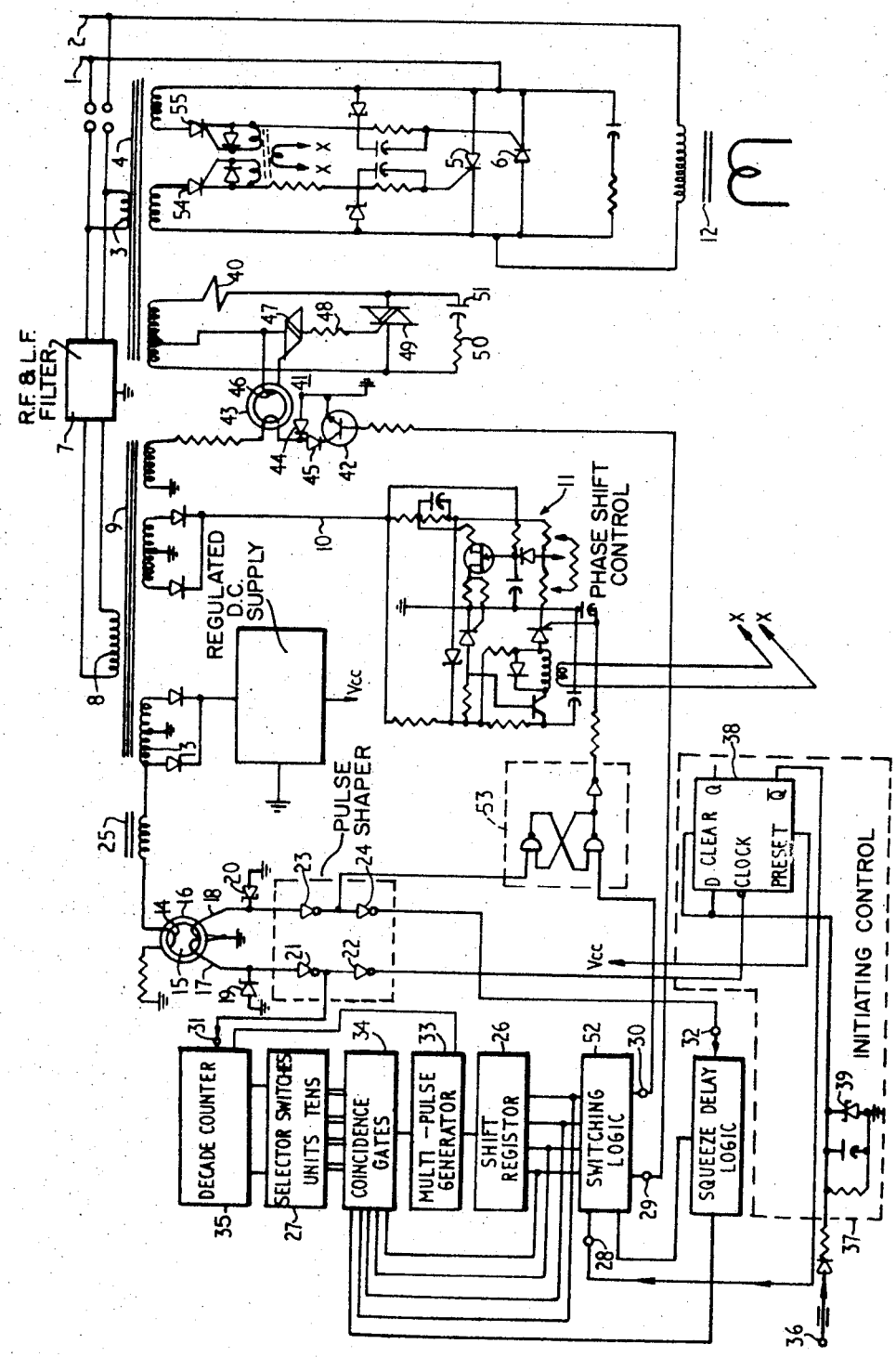

MAGNETIC FIRING CIRCUITS

This invention relates to magnetic firing circuits. The circuits according to the invention are particularly useful in electrical welding control systems, although their use is not limited to such uses.

In a fully solid state electrical welding control system it is necessary to provide firing pulses for operating the semi conductor switches controlling solenoid air valves. The present invention enables such pulses to be generated synchronously from the mains supply by a simple circuit which affords not only electrical isolation but a high degree of decoupling between the control circuit and the alternating current and pulse circuits. Because of the last-mentioned isolation the control circuit is substantially unaffected by noise and transients on the mains.

According to this invention a magnetic firing circuit comprises a magnetic core having a rectangular hysteresis loop, a primary winding for the core connected to a source of alternating current, means for producing a current through a control winding in one direction to hold the core in a state of saturation in one direction in the absence of a control voltage, means for providing a current through the said control winding in the opposite direction to hold the core in a state of saturation in the opposite direction when the control voltage is present, and an output winding on the core.

Reference will now be made to the accompanying drawing which shows a weld control system including the firing circuit of the present invention.

In the electrical resistance welding control system shown in the drawing the firing circuit of the present invention is used as the means for generating control pulses for the operation of the solenoid air valve. Briefly the operation of the system as a whole is as follows. The mains input is shown at 1,2 and is applied to the primary winding 3 of the transformer 4 feeding the firing circuits for the main S.C.R.'s 5,6 and via R.F. and L.F. filter circuits 7 to the primary 8 of a power transformer 9 supplying power to other parts of the system. A regulated D.C. output Vcc is provided for operation of the logic circuits, and a D.C. output at 10 for the phase shift heat control circuit 11. The welding transformer is shown at 12.

One side of the secondary winding 13 of the transformer 9 is connected to the exciting winding 14 of a magnetic core type pulse generator 15. The core 16 has a rectangular hysteresis loop, and the alternating current through the winding 14 drives the flux hard into saturation in the positive and negative directions alternately. As the flux is switched after each current zero crossover point a voltage pulse is generated in each secondary winding 17,18. The pulses in the two pulse trains are displaced in phase by 180°, and the pulse trains from the windings 17,18 are referred to herein as phase one clock pulses and phase two clock pulses respectively. The two pulse trains are amplitude limited by zener diodes 19,20 and shaped by standard logic inverters 21, 22, 23, 24 which function as amplifiers.

One of the advantages of the use of the magnetic core pulse generator is that, for a transient to have sufficient power to influence the secondary pulse, it would require an amplitude greater than that of the driving current and a pulse length significant with respect to the core switching time (about 250 microseconds) — since these conditions are not approached simultaneously in practice the pulse is effectively isolated from line disturbances. For reasons to be explained later the pulses are delayed by about 87 electrical degrees with respect to the line voltage by means of the inductor 25 in series with the primary 14.

A logic circuit configuration is provided which counts phase 1 pulses, and, by means of the squeeze delay logic and a shift register 26, sequences through the five control phases of squeeze delay, squeeze, weld, hold, and off, and provides operation at predetermined pulse counts determined by the settings of the selector switches 27. The logic circuitry, considered as a single component of the system, has three main terminals, namely, 1. an input terminal 28 to which a voltage is applied to initiate the sequence,
2. an output terminal 29 at which a voltage level will be switched to provide control of the solenoid air valve (S.A.V.) power, and
3. an output terminal 30 at which a voltage level will be switched to provide control of the weld power.

In addition there are subsidiary connections, of phase 1 clock pulses to terminal 31 of a decade counter 35, phase 2 control pulses to terminal 32 and the D.C. supply voltage Vcc.

The pulse generator 33 following the coincidence gates 34 provides pulses which reset the counter 35 and shift the shift register 26 to the following sequence.

Operation of the trigger switch on the welding gun causes an A.C. voltage to be applied to the terminal 36 at a random time. The initiating control circuit 37 provides a D.C. control voltage to the terminal 28 of the logic circuitry at a later synchronous time defining the start of a control sequence. This A.C. control voltage from terminal 36 is applied to a clocked flip-flop 38. The input information on data terminal D is transferred to the complementary output terminal $\bar{Q}$ on the positive edge only of the phase 1 clock pulse. Clock triggering occurs at a voltage level of the clock pulse and is not directly related to the transition time of the positive going pulse. After the clock input threshold has been passed the data input D is locked out. This use of a clocked flip-flop limits circuit susceptibility to noise to a window only a few nanoseconds wide and also provides for a synchronized starting time for the counting cycle.

The solenoid air valve control voltage at terminal 29 is used to control the current through the solenoid 40 by means of the control circuit according to the present invention which is indicated generally at 41. In the absence of control voltage transistor 42 is non-conducting, and the magnetic core 43 is in a state of positive saturation by virtue of the diode 44 included in the driving circuit and no pulses are produced. When the transistor is provided with a small base current it conducts to supply the other half cycle of excitation. Diode 45 prevents the application of reverse voltage to the transistor collector. The base of the transistor is switched on by the logic circuitry at a time determined by phase 1 clock pulses and when the transistor collector is blocked by diode 45. At the commencement of the following half cycle the transistor conducts, causing a flux swing to negative saturation, and a corresponding pulse in winding 46. This pulse causes triac 47 to conduct which latches through a resistive load 48 to maintain a firing current to a second triac 49 so that the solenoid air valve current will be continuous, and independent of the solenoid power factor. The main triac 49 is shunted by an R.C. snubbing network 50,51.

It will be seen that with this firing circuit a pulse is produced initially only at the beginning of the first positive going half cycle after the application of a control signal, and thereafter alternate positive and negative pulses are produced at each zero crossing point of the A.C. supply current. These alternate pulses are suitable for firing a triac from a half wave control current. It has the further advantages that it gives a considerable power gain, provides a memory function (thus a pulse will be produced if control was effective during the previous half cycle), and provides electrical isolation between the control source and firing circuit, and also a high degree of noise isolation.

The subsequent operation of the equipment during a welding cycle is briefly as follows. A weld control voltage appearing at terminal 30 is used to control the phase shift heat control 11 by way of a half cycle delay latch 53. The output at terminals X of heat control 11 is used to control the small S.C.R.'s 54,55 which in turn control the main S.C.R.'s 5,6.

While the control current in the embodiment described passes through the primary winding, this is not essential. Instead the core may carry an exciting primary winding connected to a source of alternating current, and separate winding or windings carrying the control current used to set the state of saturation.

What I claim is:

1. A magnetic firing circuit comprising a magnetic core having a rectangular hysteresis loop, a control winding for the core connected to a source of alternating current, means for providing half cycles of current flow through said control winding in one direction to magnetically saturate the core in one direction in the absence of a control voltage, means responsive to the presence of a control voltage to provide alternate half cycles of current flow through said control winding in the opposite direction to alternately reverse the direction of magnetic saturation of said core, and an output winding on said core.

2. A magnetic firing circuit as claimed in claim 1 in which the means for providing the said current in one direction is a diode connected in series with the said control winding and the A.C. source, and the means for providing the said current in the opposite direction is a transistor whose collector-emitter path is connected in series with the said control winding and A.C. source.

3. A magnetic firing circuit as claimed in claim 2 in which a diode is provided in the collector circuit of the transistor to prevent application of reverse voltage to said collector.

* * * * *